United States Patent [19]

Erwin

[11] 3,976,537

[45] Aug. 24, 1976

[54] HEAT EXCHANGERS AND EVAPORATORS

[75] Inventor: Ransome W. Erwin, Holtville, Calif.

[73] Assignee: Austral-Erwin Engineering Co., Houston, Tex.

[22] Filed: Feb. 4, 1975

[21] Appl. No.: 546,944

Related U.S. Application Data

[60] Division of Ser. No. 409,659, Oct. 25, 1973, Pat. No. 3,939,036, which is a continuation-in-part of Ser. No. 306,183, Nov. 14, 1972, Pat. No. 3,891,496.

[52] U.S. Cl. .................................. 159/23; 159/31; 159/DIG. 13; 159/DIG. 4; 159/DIG. 33; 159/28 B; 159/1 RW
[51] Int. Cl.² ............................................. B01D 1/00
[58] Field of Search ............ 159/1 RW, 23, 1 C, 31, 159/DIG. 13, DIG. 33, DIG. 4, 28 B; 165/138

[56] References Cited
UNITED STATES PATENTS

| | | | |
|---|---|---|---|
| 1,731,146 | 10/1929 | Morterud | 159/15 X |
| 2,579,203 | 12/1951 | Putney | 159/1 C UX |
| 3,323,575 | 6/1967 | Greenfield | 159/DIG. 17 |
| 3,393,133 | 7/1968 | Baird | 159/15 UX |
| 3,510,455 | 5/1970 | Olson | 117/148 X |
| 3,563,785 | 2/1971 | Oga et al. | 117/132 CF |
| 3,664,888 | 5/1972 | Oga et al. | 117/132 CF |
| 3,741,878 | 6/1973 | Osdor | 159/DIG. 17 |

*Primary Examiner*—Jack Sofer

[57] ABSTRACT

The invention comprises a method of evaporating an aqueous solution containing dissolved solids or mineral salts without adherence of the solids or mineral salts to any surfaces contacting the aqueous solution which comprises the following steps:

a. Flowing the aqueous solution as an outside medium mixed with sufficient dispersed oil to form a continuous film on all preferentially oil wettable contacting surfaces, upward through a confined heating and vaporizing zone and therein contacting heating elements the surfaces of which are substantially zero water adsorbent and totally wetted with a film of oil, converting a portion of the aqueous solution to water vapor and precipitated solids.

b. Separating this mixture of oil, misty vapors, solids, and remaining aqueous solution (still the outside water medium) into components of thereof in succeeding zones or chambers in which substantially all surfaces contacting these materials are preferentially oil wettable.

The invention also relates to apparatus in which the above method may be carried out.

22 Claims, 3 Drawing Figures

HEAT EXCHANGERS AND EVAPORATORS

RELATED APPLICATIONS AND BACKGROUND OF THE INVENTION

This application is a division of my application Ser. No. 409,659, filed Oct. 25, 1973, U.S. Pat. No. 3,939,036, which is a continuation-in-part of Ser. No. 306,183 filed Nov. 14, 1972, now U.S. Pat. No. 3,891,496 dated June 24, 1975.

Application Ser. No. 409,659 is related to my application Ser. No. 401,655, entitled "Improvements In Heat Exchangers and Evaporators", filed Sept. 28, 1973, U.S. Pat. No. 3,925,149, which is also a continuation-in-part of Ser. No. 306,183. The present application is also related to my application Ser. No. 536,792 filed Dec. 27, 1974, U.S. Pat. No. 3,925,148 which is a Division of Ser. No. 401,655, and the claims of Ser. No. 536,792 relate to apparatus, as do the claims of the present application; whereas the claims of Ser. No. 306,183, Ser. No. 401,655 and Ser. No. 409,659 all relate to method. The disclosures of Ser. No. 306,183 and 401,655 offer different approaches to evaporating aqueous solutions without adherence of solids to contacting surfaces, although both use the same fundamental principle of utilizing scale preventing oil films on preferentially oil wettable surfaces as taught in my application Ser. No. 306,183. The most distinct differences in the two methods are as follows:

Ser. No. 306,183 and Ser. No. 401,655, Case 2 teach mixing and circulating the aqueous solution with hot oil, the oil being heated either prior to mixing or during mixing, transferring heat from the oil (this oil being the outside medium of the mixture) to small droplets of aqueous solution thereby converting all or a portion of it into vapor and solids. The present application teaches circulation and heating of aqueous solution as the outside medium, containing entrained oil to function as a protective film formed on all contacting preferentially oil wettable surfaces, thereby preventing the adherence of solids to said surfaces, such solids being present in the aqueous solution initially or after heating. The present application also teaches a novel method and apparatus for capturing entrained oil droplets from circulating aqueous solutions and continuously applying them as a moving film on the total surface of a heating element, said surface being preferentially oil wettable and substantially zero water absorbent, such apparatus and method being fully disclosed in Objects and Description to follow. This application also teaches a novel method of enhancing the oil wettability of a preferentially oil wettable surface in submerged contact with a mixture of oil and aqueous solution, wherein the aqueous solution is usually the outside medium, this method consisting of the permanently roughening or etching of said oil wettable surface prior to use. I have found that an oil wettable surface functions better when smooth when in contact with mixtures of oil and aqueous solution wherein the oil is the dominating, outside medium, particularly when exposed to an atmosphere of vapor, having less tendency to adhere to solids, as is the condition prevailing in Ser. No. 306,183 and Ser. No. 401,655, Case 2. A very distinct difference between the disclosures of the present application and those previously mentioned resides in the fact that whereas in those disclosures only oil is heated and thus heat is transferred to dispersed droplets of aqueous solution, the present application teaches direct heating of circulating aqueous solution through a film of oil, usually quite thin, on the preferentially oil wettable surface of a heating element, this film functioning to prevent adherence of solids to the heating surface.

There are inherent advantages in both approaches, referring to oil as the outside medium in contrast to aqueous solution as the outside medium, the most desirable approach being determined by the particular evaporating problem involved. Some examples of such problems and the recommended approach are as follows: minimum a. Use injection and dispersion of aqueous solution into pre-heated oil as taught in Ser. No. 306,183 when:
  1. The source of heat is dilute, radiant and requires extensive horizontal surfaces such as would be used in capturing solar heat, and in which clean oil must be used with no settling out of solids, the subsequent evaporation of aqueous solution injected into the oil being carried out in sub-atmospheric pressures.
  2. The source of heat is remote and evaporation cannot be performed at such source, such as in some geothermal applications and utilizing terrestrial heat by the circulation of clean oil through hot earth formations.
  3. The produced solids can be readily washed free of coatings of oil.
  4. It is desirable to evaporate a solution to total dryness and oily solids can be tolerated.
  5. Multi-stage evaporation is not required, energy costs are no factor, and temperatures appreciably higher than the boiling temperature of the aqueous solution are available.
  6. It is useful to utilize the oil as a vehicle for conveying solids from one location to another.

b. Use direct heating of circulating mixtures of predominantly oil (outside medium) and dispersed aqueous solution, as depicted in Ser. No. 401,655, Case 2 when vaporizing can be performed at the source of heat, evaporation to dryness is required, oily solids can be tolerated, and circulation of contaminated oil is effected by injection of inert gas such as steam, eliminating the need for a pump that is subject to fouling when circulating contaminated oil.

c. Use a system where film-forming oil is dispersed in a circulating aqueous solution which is the outside medium and is heated sufficiently to form precipitated solids, as taught in this application, when:
  1. Low inventories of oil are desirable or required.
  2. Very clean, oil-free solids are required.
  3. Minimum temperature drops in heat exchange prevail, such as in multi-stage evaporation systems.
  4. The saturation and soluble salts precipitation state of an aqueous solution is not reached, such as in the first stages of a multi-stage evaporation system, and the only solids present are those formed by heat breakdown of compounds such as calcium bicarbonate which breaks down to form insoluble calcium carbonate, the stable salts remaining in solution until evaporated out in further stages.

OBJECTS OF INVENTION a. The primary object of this invention is the provision of an evaporator which may be used in single or multiple stages, wherein aqueous solutions containing film-forming dispersed oil may be circulated, heated, and vaporized, forming entrained solids, without adherence of the solids to any contacting surfaces which are preferentially oil wettable and substantially zero water adsorbent.

b. Accomplishing (a) in which the system is contained in a single housing.

c. Accomplishing (a) in which the entrained oil may be kept in suspension in the circulating aqueous solution by provision of sufficient velocity of the solution and sufficient density for the oil.

d. Accomplishing (a) in which an oil-free solid is produced by precipitation from the aqueous solution.

e. Accomplishing (a) in which solids are continuously removed from the evaporator as follows: circulating an oily aqueous solution through an upper oil zone, down through a lower solids settling zone, picking up the solids as a slurry, passing out with it from the bottom of the evaporator, flowing into a pump which forces the solids-aqueous solution-oil mixture through a solids removing separator, returning the oily aqueous solution to the oil zone of the evaporator to repeat the cycle.

f. Accomplishing (e) and providing sufficient velocity of the oily aqueous solution as it flows down through the oil zone that it will entrain additional oil to be carried down to a zone in the evaporator where a portion of this entrained oil joins aqueous solution flowing upward through a confined heating and evaporating zone, thereby aiding in supply of film-forming oil for the heating elements, and the other portion of the oil flowing downward with the aqueous solution as it sweeps out solids from the evaporator, this oil supplying film forming oil for the solids separating step and the pump ahead of this step, and all of the conduits for the oily aqueous solution as it returns to the evaporator or to a second stage of evaporation.

g. Accomplishing (a) in which heat is supplied by vertical, suspended heating elements in which the outer surface is substantially zero water adsorbent and from which heat may be derived by any means such as electrical resistance, condensing vapors or circulating fluids, these heating elements being coated with oil films to prevent adherence of solids to same.

h. Accomplishing (g) in which the lower end of the heating element contains a shallow, perforated or serrated sleeve coated with or made of substantially zero water adsorbent material such as a fluorocarbon resin, this sleeve functioning as a trap for upward moving, suspended oil droplets in aqueous solution, feeding this oil through the perforations or serrations to provide a uniformly applied, continuous upward moving film of oil, fully coating the entire length of the heating element.

i. Accomplishing (a), utilizing heating elements which have a substantially zero water adsorbent surface in contact with the aqueous solution and oil, the aqueous solution being the outer medium, and this heating element surface being slightly roughened or etched in order to promote better retention and spreading of oil drops that contact it as the mixture of aqueous solution and oil droplets flows against it.

The invention will be more readily understood by reference with accompanying drawing in which.

DESCRIPTION OF INVENTION

Figure 1:
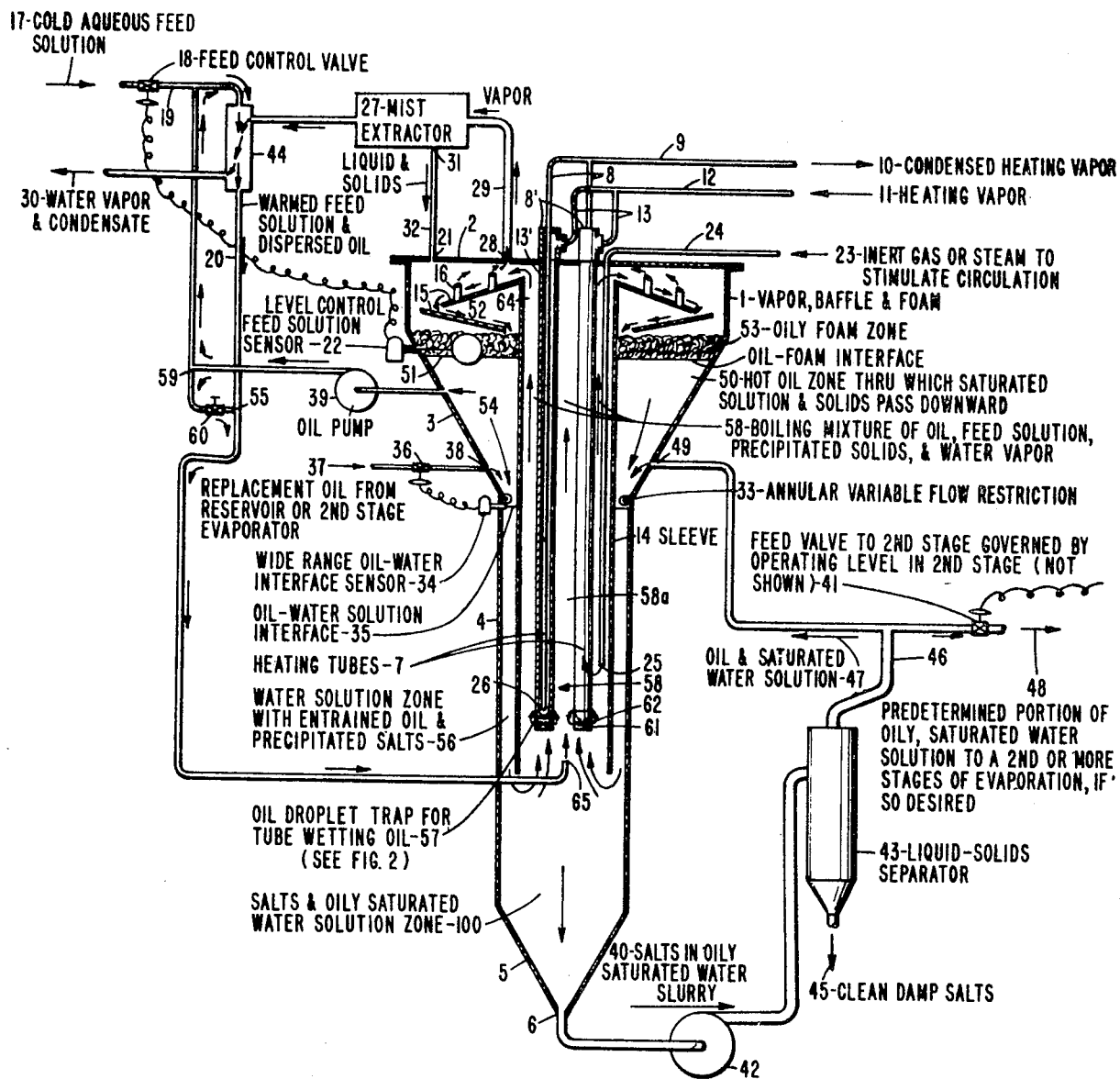
FIG. 1 is a schematic view of an apparatus for carrying out the invention including an evaporator having heating tubes or elements partly shown in longitudinal section and partly in elevation.

FIG. 1:
1. Vapor, baffle, and foam chamber.
2. Cover for 1
3. Cone-shape oil chamber
4. Lower pipe leg of evaporator
5. Coned bottom of evaporator
6. outlet from bottom of the evaporator for oily solids-aqueous solution slurry.
7. Heating tubes or elements.
8. Inner tubes for condensate removal from heating tubes.
8'. Inlet and outlet tee for heating tube 7
9. Condensate conduit from evaporator (condensed heating vapor)
10. Condensate disposal source.
11. Source of heating vapor.
12. Heating vapor conduit from source 11.
13. Heating vapor conduits to heating tubes 7.
13'. Annular vapor space between condensate removal tubes 8 and heater tubes 7.
14. Inner sleeve for housing heater tube bundle and providing confined path for upward moving oil and aqueous solution to be heated. The sleeve 14 serves as a housing for the evaporator chamber, hereinafter referred to as 58a, the contents of which chamber are heated by heating tubes 7, hereinafter referred to as heating means.
15. Evaporating and vapor removing baffles.
16. Baffle vent tubes.
17. Source cold aqueous feed solution.
18. Feed control valve.
19. Cold acqueous feed conduit to heat exchanger 44.
20. Oily warmed feed solution conduit to evaporator, discharging at 65 into lower end of sleeve 14, this conduit 20 leading from heat exchanger 44.
21. Evaporator inlet for removed liquids and solids from mist-extractor (27).
22. Level control sensor for controlling amount of feed solution, via valve 18.
23. Source of inert gas or steam to stimulate circulation of oily aqueous solution upward through heating zone in sleeve 14.
24. Conduit for inert gas or steam.
25. Discharge outlet for inert gas or steam in sleeve 14.
26. Condensate accumulation zone inside lower end of heating tube 7.
27. Mist extractor for produced water vapor.
28. Produced vapor outlet from evaporator.
29. Conduit for produced vapor, leading to mist extractor 27 from the top of the evaporator.
30. Clean produced water vapor and condensate from heat exchanger 44.
31. Liquid and solids outlet from mist extractor 27.
32. Conduit for liquids and solids from mist extractor 27, leading to the evaporator inlet 21.
33. Variable flow restrictor for altering the flow velocity of circulating oily aqueous solution as it leaves oil zone 50 at the juncture of pipe leg 4 and cone shaped chamber 3, set to provide sufficient velocity to entrap and retain sufficient oil for film forming on the heating elements, (details not shown as many arrangements and designs would suggest themselves to those skilled in the art)

34. Oil-water solution interface sensor to actuate oil supply valve 36 which maintains sufficient oil in the evaporator.

35. Oil-water or aqueous solution interface.

36. Control valve for replacement oil.

37. Source of replacement oil.

38. Replacement oil entry to evaporator oil zone.

39. Hand regulated pump to supply film forming oil to be mixed both with incoming cold feed solution and with the warmed feed solution after it leaves heat exchanger 44.

40. Mixture of salts and oily saturated aqueous solution, passing through pump 42 from outlet 6 of the evaporator.

41. Control valve, governed by aqueous solution level in a succeeding stage of evaporation (not shown), which feeds a portion of the oily saturated aqueous solution to this succeeding evaporating stage from discharge conduit 46 from solids separator 43.

42. Hand controlled variable circulating pump for passing oily solids-aqueous solution slurry to solids-separator 43, supplying flow pressure for oily aqueous solution to a succeeding stage of evaporation, and for recycling the balance of oily aqueous solution back to the parent evaporator through conduit 47 and evaporator inlet 49.

43. Liquid-solids separator. (details not shown as many types may be used)

44. Indirect heat exchanger for pre-heating cold feed solution, utilizing produced vapor in this disclosure for heat, but which may be used with other hot fluids from the process as so desired.

45. Clean, damp solids for salts from separator 43.

46. Removed oily saturated aqueous solution from liquid-solids separator 43.

47. Oily saturated aqueous solution conduit to recycle to first stage or parent evaporator.

48. Predetermined portion of oily aqueous solution, governed by the set capacity of the succeeding evaporator, flowing to said evaporator (not shown).

49. Oily saturated aqueous solution, recycled, inlet to oil zone 50 of parent evaporator.

50. Hot oil zone in chamber 3.

51. Oil-foam interface in chamber 3.

52. Vapor zone of chamber 1.

53. Layer of oily foam in chamber 3.

54. Flow path of circulating saturated aqueous solution from chamber 3 to pipe leg 4 of evaporator.

55. By-passed oil inlet from hand set valve 60 to warmed feed solution conduit 20.

56. Flow path or zone for circulating oily saturated aqueous solution in annular space between pipe leg 4 and inner sleeve 14.

57. Oil droplet trap for capturing and feeding film forming oil onto outer surfaces of heater tubes 7.

58. A mixture of oil, feed solution, solids and water vapor between tubes 7 and inside confining sleeve 14, all moving upwards.

58a Denotes an evaporating chamber housed within the sleeve 14 and heated by internal heating means 7.

59. Circulating oil from pump 39, hot from evaporator, supplying film forming oil to feed solution, both upstream and downstream from heat exchanger 44.

60. Hand set by-pass valve to apportion feed of oil to feed solution from source 59.

FIG. 2

62. Hollow, open-ended sleeve, either attached to or an extension of heating tube 7, composed wholly of fluorocarbon resin or of thin metal coated inside and outside with fluorocarbon resin, which functions as an oil droplet trap and distributor.

62. Outlet perforations in 61 for uniform feeding of entrapped oil to outer surface of heating tube 7.

63. Oil film as applied to heating tube 7.

FIG. 1

64. Mixture of oil, saturated aqueous solution, solids and vapor outflow from top of sleeve 14.

65. Oily, pre-warmed feed solution discharge into lower part of sleeve 14 for passage upward through the confined heating and vaporizing zone.

100. Denotes an oily aqueous solution solids-slurry zone located below the entrance to the evaporator zone or chamber 58a and above the outlet 6 leading to the pump 42.

OPERATION OF INVENTION

FIG. 1: Cold aqueous feed solution to be treated and which may contain both dissolved and dispersed solids and which solution may be either saturated or unsaturated, from source 17 passes through control valve 18 and conduit 19 to heat exchanger 44. Control valve 18 is governed by a level control float actuated sensor 22 to maintain nearly constant level of liquids (with oil layer on top) in evaporator chamber 3. Before entering the heat exchanger 44, the cold aqueous feed solution is mixed with a portion of oil, just sufficient to maintain films of oil on the preferentially oil wettable surfaces in its flow path, such oil provided from pump 39, the amount governed by the adjusted capacity of the pump and by-pass valve 60. As shown the cold oily feed solution is indirectly pre-heated in a heat exchanger 44, in this disclosure with vapor produced from mist-extractor 27 of the evaporator, but may be heated with any desired hot fluids from the system. Excess vapor and condensate leaves the heat exchanger at 30. The pre-heated oily solution flows through conduit 20 mixing with the other portion of hot oil from pump 39 which is by-passed from outlet 59 through hand regulated valve 60 and which enters conduit 20 at inlet 55, the mixture then entering the evaporator at discharge 65 at the lower end of inner sleeve 14 through which it flows upward for heating and vaporizing. The portion of hot oil from pump 39 which by-passes heat exchanger 44 by admission through hand set valve 60 entering at 55 to join the oily pre-warmed feed solution in conduit 20 it utilized to supplement, only when needed, the film forming oil that is entrained in the circulating saturated solution that enters the bottom of sleeve 14 from zone 56. It is thus by-passed around heat exchanger 44 because it is hot and would defeat the heat exchange function of 44 for cooling and partially condensing the produced vapors passing through it.

This pre-warmed mixture of oil and aqueous feed solution discharging at 65 then mixes with circulating oily aqueous solution from which a portion of precipitated solids has been removed (these solids passing downward to evaporator outlet with a portion of the oily aqueous solution — later described) at discharge 65, the mixture 58 then flowing upward through the confined heating zone 58a formed by sleeve 14 surrounding heating tubes 7. In this zone 58a a portion of the aqueous solution is converted to water vapor and the resulting mixture of vapor, oil, solids and aqueous solution overflows sleeve 14 at 64, cascading down sloping baffles 15, releasing vapors and forming additional vapors by cascading evaporation exposure. Such vapors in misty vapor zone 52 pass upward through vent pipes 16, by-passing falling curtains of liquid from upper baffle 15. These vapors with a mist of oily aqueous solutions and solids are exhausted through outlet 28, pass through conduit 29 to mist extractor chamber 27. Here the scrubbed out liquids and solids bleed through bottom outlet 31, through conduit 32 to be returned to vapor chamber 1 through inlet 21. All interior surfaces of this mist-extractor are smooth, free of sharp edges, and are preferentially oil wettable. The mist-free vapors (containing inert gas if such is used for stimulating circulation through the confined heating zone — described later) pass through indirect heat exchanger 44, pre-heating incoming cold feed solution, and out at 30 as excess vapors and condensate. In multi-stage evaporating processes, these vapors would be used as a source of heat for succeeding stages, all familiar to those skilled in the art, and not disclosed here. All heat transfer surfaces of heat exchanger 44 are preferentially oil wettable to promote drop-wise condensation of vapors on one side and to assure wetting with an oil film on the feed solution side to prevent the adherence of solids. The mixture of vapor, oil, aqueous solution, and solids flows down baffles 15, releasing vapors, and on to foam zone 53 where the remaining vapor escapes as it enters oil zone 50 in chamber 3. The aqueous solution and solids mixture drops down through this oil layer at 54, past the variable flow restriction member 33 with sufficient velocity to carry a portion of the oil as entrained oil droplets with it through annulus 56. At the bottom of sleeve 14 which functions as a conduit surrounding heater tubes 7, a portion of the moving mixture of oil, aqueous solution and solids changes direction to flow upwards together with incoming feed solution through the evaporator zone or chamber 58a within the sleeve 14. Upon changing direction of flow, much of the larger particles of salts and solids drop out and flow downward with the other portion of oil and aqueous solution that is removed from the evaporator at outlet 6. The portion of oily aqueous solution that flows upward inside sleeve 14 is moved by the gas lifting effect of vaporizing water and injected inert gas or steam, if such is required. This liquid is heated to the vaporizing temperature of the water component by intimate contact with heating elements or tubes 7 shown at 58 as a boiling mixture. This mixture flows upward through the evaporator zone or chamber 58a within the sleeve 14 and overflows the top at 64 and resumes the aforedescribed cycle.

If a higher circulation rate than that induced by vaporizing of water in the heating zone is justified by the very appreciable increase in heat transfer capacity of such a system, it may be effected by the injection of steam or an inert gas such as nitrogen. This inert gas or steam from source 23 is injected through conduit 24, discharging inside sleeve 14 at outlet 25. The advantages of such injection are described in my application Ser. No. 306,183 and in continuation-in-part Ser. No. 401,655, Case 2.

The mixture of dropped out solids, entrained oil and saturated aqueous or water solution flows down to cone bottom 5 and through outlet 6 to variable pump 42 which is pre-set to circulate the optimum amount of the mixture and which pumps it to a solids-liquid separator 43 which may be one of many familiar types of separators. Here the clean, damp solids are removed at 45, the removed oily saturated aqueous solution discharging at 46. If a succeeding stage of evaporation is employed, a predetermined portion of this oily saturated solution (governed by the designed capacity of the evaporator) passes through control valve 41 as feed to the next evaporation stage through conduit 48. Control valve 41 is actuated by the aqueous solution level in this succeeding evaporator. The other portion of the oily saturated aqueous solution from the solids-separator returns through conduit 47 to enter oil zone 50 in chamber 3 at inlet 49. This returned solution flows down through the oil together with the circulating aqueous solution from the heating and vaporizing chamber previously described. The returned solution flows with sufficient velocity, governed by the circulating rate of pump 42, to aid in capturing entrained downwardly flowing oil for recycling with aqueous solution through the heat zone 58a in sleeve 14 and to provide sufficient film forming oil for all preferentially oil wettable surfaces in cone 5, outlet 6, pump 42, liquid-solids separator 43, control valve 41, and all conduits connecting these to the parent evaporator and any succeeding evaporator.

Since oil losses from the system are inevitable, especially where a portion of oily aqueous solution passes to a succeeding evaporation stage, provision must be made to supply make-up to supply make-up oil as needed. This may be performed in several ways familiar to those skilled in the art. One method is depicted using a wide range oil-water interface sensor 34 which actuates oil feed valve 36 whose source of oil is a supply reservoir (not shown) or pumped directly from the succeeding stage evaporator if such is used, shown as source 37; this oil passing through control valve 36 to enter chamber 3 at inlet 38.

Figure 2:
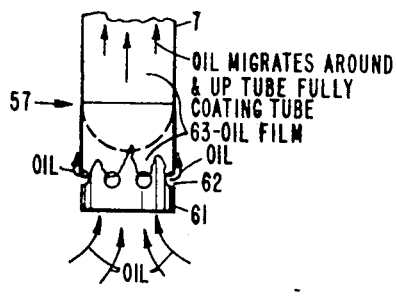
FIG. 2 is a detailed view of the lower portion of one of the tubular heating elements in FIG. 1 which may be either attached to or an extension of the heating element or tube.
Figure 3:
FIG. 3 is a modification of FIG. 2 showing a serrated lower edge.

DESCRIPTION OF NOVEL METHOD OF ASSURING FULL WETTING OF HEATING TUBE WITH OIL (See FIGS. 1 & 2)

As disclosed in my application Ser. No. 306,183 and Ser. No. 401,655, Case 2 in order to prevent adherence of solids to contacting surfaces, particularly heating surfaces, where mineralized waters are heated to boiling temperatures, a protective film of oil must be maintained on the contacting surface. As set forth in such prior applications, Ser. No. 306,183 and Ser. No. 401,655. I found that only substantially zero water adsorbent materials such as the fluorocarbon resins or polymers would remain preferentially oil wettable when exposed to water for prolonged periods. As set forth in Ser. No. 306,183, fluorocarbon resins or polymers such as DuPont's Teflon and particularly FEP resins such as hexafluoropropylenetetrafluoroethylene have been found particularly suitable as substantially zero water adsorbent material for use in the present process and apparatus. Other normally preferentially oil wettable materials such as poly propylene, poly ethylene, nylon, neoprene, silicones, epoxy resins, and phenolic resins eventually become water wettable when exposed to water, especially at elevated temperatures, and will permit adherence of solids precipitates from boiling mineralized water or aqueous solutions to heating surfaces coated with such. Therefore, to prevent adherence of solids to such heating surfaces, they must be coated with a substantially zero water adsorbent material and a continuous film of oil maintained on them at all times. I found that heating elements submerged in an environment of water, when smoothly coated with a fluorocarbon such as DuPont FEP or TFE, are more subject to wetting with contacting oil droplets moving upward through a water medium when the surface is not completely vertical and the droplet is permitted to collide with it in its upward travel, rather than it touching it glancingly as would be for a fully vertical surface. Because of this, horizontal heating elements would be more wettable to up-moving droplets, the droplet bursting and spreading and wetting the surface with oil by direct collision, whereas vertically disposed heating elements with smooth fluorocarbon surfaces will wet with only a portion of droplets contacting the non-vertical surfaces at the closed off lower of a suspended tube or element. I noted that most of the oil droplets glancing against the vertical surface of the heating element, as they were deviated from their upward travel vertical path by turbulence in the moving aqueous solution, did not cling to the surface and wet it, but bounced off and continued their flow with the aqueous solution. I then discovered that if the fluorocarbon surface were roughened, very slightly, it had a much greater affinity for the colliding or brushing oil droplet, virtually grabbing it and becoming wet with it. Such surfaces may be roughened or etched quite economically, and provide a much greater wettability for the same, thereby assuring more complete wetting and non-adherence of solids, and requiring less oil to do so. Since the single ended, suspended vertical heating element or tube offers so many advantages over horizontal or U-tube types as disclosed in my application Ser. No. 306,183, its wetting with oil being no problem in that disclosure since the element is submerged in an environment of oil which is the outside medium, I was compelled to find a means of assuring a continuous and complete film of oil on my vertical heating element when immersed in a water medium containing dispersed oil droplets as taught in this disclosure. Roughening the surface as above-described was one answer, but I still needed a simple means catching the oil droplets and uniformly applying them to the lower end of the heating element to assure a continuous upward flow of oil film on its surface. To do this I devised the disclosed combination oil trap and distributor. It consists of a simple sleeve 61 composed of pure fluorocarbon resin or thin metal coated inside and outside with fluorocarbon resin. It is relatively short and may be a continuation of tube 7 with the closure for the end of tube 7 forming the top closure for the sleeve, or it may simply be attached to the end of tube 7 by heat bonding or cementing. It contains distribution openings 62 or a serrated bottom rim (not shown) to assure uniform feeding of caught oil to the outer full surface of sleeve 61 and tube 7 as shown at 63 in FIG. 2. The hollow sleeve captures upward moving oil droplets, distributing them thusly, assuring full coverage of tube 7 with an oil film, requiring a minimim amount of such oil.

A brief description of heating element 7 shown as a heating tube in this disclosure, and fully described in my Ser. No. 306,183, is as follows:

Heating vapor from source 11 is injected through conduit 12 into tee 8' and on into the annular space between outside tube 7 and inner condensate discharge tube 8. The vapor condenses on the inside surface of the tube 7 as heat is transferred to the aqueous solution on the outside, accumulating at the bottom at zone 26, then exhausting through tube 8 with minimum escape of vapor due to proper sizing of tube 8, the condensate passing through conduit 9 to destination 10.

ADVANTAGES OF INVENTION

Some important advantages of this invention over the prior art, including my applications Ser. No. 306,183 and Ser. No. 401,655, (Case 2) are as follows:

a. Direct heating of aqueous solution by heat transfer through a fluorocarbon coated metal wall and a comparatively thin film of oil requires less temperature drive than the method of first heating oil, then transferring this heat from the oil to contacting water droplets for vaporizing, thus being preferable for use with multistage evaporators where low temperature drops are prevalent.

b. This method requires far less oil inventory than methods using oil as the outside medium to be heated for boiling injected aqueous solution.

c. It produces a cleaner and more oil-free solids product.

d. In this process, when circulating solids crystals in a saturated aqueous solution, there is more potential for forming larger crystals with better settling characteristics than when circulating crystals suspended in oil.

e. This method requires fewer and simpler level and feed controls, for example only two as disclosed, whereas the earlier disclosures in Ser. No. 306,183 and Ser. No. 401,655, Case 2 require 3 or more.

f. Since the specific heat of water solutions is double or more than that of most hydrocarbon oils, the heat transfer efficiency of this method is appreciably greater than that wherein oil is heated and then used to heat the aqueous solution.

g. The general advantages of this evaporating method over the existent methods (excluding my Ser. Nos. 306,183 and Ser. No. 401,655, Case 2), is the method of using preferentially oil wettable contacting surfaces, substantially zero water adsorbent for the heating element contacting surfaces, together with dispersed oil suspended in an outside aqueous solution medium for forming a solids adherence preventive film, and evaporating aqueous solution beyond the saturation point without need for chemical pre-treatment and without fouling the contacting surfaces with precipitated solids.

h. The advantages of the new disclosures pertaining to the heating element are:
1. The novel oil catching and distribution shell on the lower end of the heating element, as previously described, assures maximum application and coating of oil on the preferentially oil wettable tube surface with minimum oil requirement, being simple, inexpensive, dependable, and trouble free with no moving parts.
2. The novel method of slightly roughening or etching the fluorocarbon resin surfaces on the heating elements, as well as other submerged surfaces in the system if so desired, assures complete coating with a minimum amount of oil including both oil introduced in the oil catcher and random drops that brush against the vertical surfaces as they travel upward with the aqueous solution between the heating elements, all of this aiding in assuring non adherence of solids to such surfaces.

What is claimed is:
1. A suspended tubular element for heating oily aqueous solutions, wherein the lower end consists of a shallow shell cap for entrapment of oil open at its bot- tom and closed at its top by the bottom of the elements, composed of pure fluorocarbon resin or thin metal coated inside and outside with fluorocarbon resin, and which contains sufficient lateral openings in such shell to permit uniform distribution of entrapped oil to fully coat the heating element with an upward moving, continuous film of oil.

2. A heating element according to claim 1 wherein the lower rim of the shallow shell cap is serrated, permitting entrapped oil to underflow through the serrations and uniformly wet the shell cap and heating element.

3. An apparatus for evaporating aqueous solutions containing solids and/or mineral salts without adherence of such solids to any surface contacted by the aqueous solution, wherein all contacting surfaces are preferentially oil wettable and coated with an oily liquid, and all heated surfaces are also substantially zero water adsorbent and comprise flurocarbon resins or polymers, said apparatus comprising an outer container enclosing a confined heating and vaporizing zone, having therein heating means arranged to be externally contacted by fluids within said heating and vaporizing zone and being provided with an external contacting surface which is both preferentially oil wettable and substantially zero water adsorbent; a source of cold aqueous feed solution containing solids and/or dissolved mineral salts; a feed line leading from said source of aqueous solution to a portion of said outer container adjacent to but below said heating means; means for supplying a heated liquid containing oil to said aqueous cold feed line, prior to entry into said container; means for effecting flow of said aqueous feed solution and oil through said heating and vaporizing zone and into contact with the exterior of said heating means, whereby said heating means is externally coated with oil and said aqueous feed liquid is at least partially vaporized and the vapor separated from the oily liquid and solids; upper outlet means for withdrawing hot vapor derived from contacting said aqueous feed solution with said heating means from the upper portion of said container; lower outlet means for withdrawing and conveying a slurry including solids, salts and oily saturated water solution from the lower portion of said container for further treatment; and intermediate outlet means for withdrawing a portion of the oil supplied with the aqueous feed solution to said container below said heating means from said container intermediate said upper vapor outlet means and the lower outlet means for slurry and the like said outlet means being connected to the means for supplying a heated liquid containing oil.

4. An apparatus as defined in claim 3 wherein the lower portion of said outer container is in the form of a downwardly convergent cone.

5. An apparatus as defined in claim 3 wherein the outer container comprises an elongated upright vessel and said heating means comprise a closed bottom end heat exchange tube extending downwardly from the top of the vessel but terminating short of the bottom thereof, through said heating and vaporizing zone in indirect heat exchange relation to fluids within said heating and vaporizing zone, means for passing a condensible heating fluid in vapor form downward through said tube to supply heat to the fluids surrounding said tube and means for withdrawing vapor condensate from the upper portion of said tube.

6. An apparatus as defined in claim 5 wherein the lower end of the heat exchange tube of said heating means comprises additionally a subsequent shallow shell cap for entrapment of oil open at its bottom and closed at its top by the tube bottom composed of pure fluorocarbon resin or thin metal coated inside and outside with fluorocarbon resin, and which contains sufficient openings in the sidewall of such shell to permit uniform distribution of entrapped oil to fully coat the heating element with an upward moving, continuous film of oil.

7. An apparatus as defined in claim 6 wherein the lower rim of the shallow shell cap is serrated, permitting entrapped oil to underflow through the serrations and uniformly wet the shell and heating element.

8. An apparatus as defined in claim 3 in which the lower outlet means includes pump means located downstream from the container of the evaporating apparatus to aid in the withdrawal of slurry from the container and apply pressure to the withdrawn fluid.

9. An apparatus as defined in claim 8 wherein the lower outlet means includes liquid-solids separating means located downstream from the pump means.

10. An apparatus as defined in claim 9 wherein the liquid-solids separator is provided with means for returning a portion at least of the separated liquid to the outer container of said evaporating apparatus.

11. An apparatus as defined in claim 10 wherein said liquid-solids separating means is provided with means for passing a portion of the separated liquid to a further stage of evaporation.

12. An apparatus as defined in claim 3 wherein the outer container comprises an upright vessel and said heating means extends downwardly into said vessel from the top thereof and terminates short of the bottom of the vessel.

13. An apparatus as defined in claim 12 wherein the upright vessel houses successive separating zones including (a) an upper zone for misty aqueous vapors, (b) a relatively quiescent oil zone for aqueous solution contaminated oil, (c) a zone for oily aqueous solution, and (d) a lower zone for oily aqueous solution solids slurry, said successive zones being arranged in downwardly descending order according to the specific gravity of the fluids contained therein, and lightest being at the top and the heaviest at the bottom.

14. An apparatus as set forth in claim 13 wherein a hot vapor discharge line is connected to the vapor zone of the upright vessel, means in said hot vapor discharge line for passing said hot vapor in heat exchange relation to the aqueous feed flow line, means including a flow line for withdrawing liquid from the oil zone, means for supplying liquid from said last named flow line to the aqueous feed flow line prior to said heat exchange means.

15. An apparatus as set forth in claim 13 wherein said hot vapor discharge line is connected to the vapor zone of the upright vessel, means in said hot vapor discharge line for passing said hot vapor in direct heat exchange relations to the aqueous feed flow line, means including a flow line for withdrawing liquid from the oil zone, means for supplying liquid from said last named flow line to the aqueous feed flow line upstream of said heat exchange means.

16. An apparatus as defined in claim 12 wherein the upper portion of the vessel includes an upper zone for hot vapors, a foam zone below the vapor zone and an external vapor discharge line leading from the upper zone for hot vapors and connected to the upper outlet means.

17. An apparatus as defined in claim 16 wherein a mist extractor is included in said hot vapor discharge line.

18. An apparatus as defined in claim 16 wherein the upper portion of the vessel is enlarged upwardly and outwardly from the lower portion and includes said upper zone for hot vapors, a foam zone directly below the vapor zone and an external vapor discharge line leading from the upper zone for hot vapor.

19. An apparatus as set forth in claim 16 wherein the vapor zone includes a pair of superposed cascading baffles to separate vapor from liquid.

20. An apparatus as defined in claim 16 wherein means are provided in said hot vapor discharge line for passing said hot vapor in direct heat exchange relation to the aqueous feed line to condense the vapor and preheat the aqueous feed prior to entry into the container.

21. An apparatus as defined in claim 20 which includes means for withdrawing water condensate from the vapor line after passage through said direct heat exchange means.

22. An apparatus for evaporating aqueous solutions containing solids and/or mineral salts without substantial adherence of such solids to surfaces contacted by the aqueous solution, wherein all contacting surfaces are preferentially oil wettable and coated with an oily liquid and all heated surfaces are also substantially zero water adsorbent, and comprise fluorocarbon resins or polymers; said apparatus comprising an outer container enclosing a confined heating and vaporizing zone, heating means therein arranged to be externally contacted by fluids within said heating and vaporizing zone and being provided with an external contacting surface which is both preferentially oil wettable and substantially zero water adsorbent; said outer container comprising a fluid tight, upright tubular vessel enlarged upwardly and outwardly at its upper portion to include an upper vapor zone with baffles therein and a foam zone below the vapor zone, the lower portion of said vessel being cone shaped and terminating in an outlet for slurry of solids in oil saturated water; an inner sleeve separating the heater means from the outer vessel, located within said outer vessel and substantially concentric therewith, said sleeve extending through the heating and vaporizing zone but terminating short of the ends of the outer vessel and enclosing said heating means, said sleeve having a lower inlet for fluids to be heated and evaporated by said heater and an upper outlet for the heat treated fluids including vapors and residual liquids and solids, said outlet opening into said vapor zone, upper perforated downwardly and outwardly sloping baffle means within said vapor zone at the outlet end of said sleeve, to receive the unvaporized fluid comprising liquid containing solids from said outlet and to remove residual vapors therefrom and lower downwardly and inwardly sloping baffle means cooperating with said upper baffle means arranged to receive the unvaporized product from said upper baffle means; and deliver it to the foam zone; a source of cold aqueous feed solution containing solids and/or dissolved mineral salts, a feed line from said source of aqueous solution to a position within said outer container adjacent to the inlet of said sleeve, means for supplying a heated oily liquid to said aqueous feed line, prior to their entry into said container to preheat the said solution, means for effecting flow of said aqueous feed solution and oily liquid through said sleeve and into contact with the exterior of said heating means, whereby said heating means is externally coated with oil and said aqueous feed liquid is at least partially vaporized and separated from the oily liquid and solids, upper outlet means in the top of said container above the vapor zone for withdrawing hot vapor, derived from contacting said aqueous feed solution and oily liquid with said heating means, from said container, lower outlet means for withdrawing a slurry including solids, salts and oily saturated water solution from the cone shaped lower portion of said outer vessel for further treatment, and intermediate outlet means for withdrawing a portion of the oil intermediate said upper vapor outlet means and the lower outlet means for slurry and the like connected to the aqueous feed line for supplying said heated oily liquid to said aqueous feed.

* * * * *